(12) United States Patent
Zhou et al.

(10) Patent No.: US 9,331,983 B2
(45) Date of Patent: May 3, 2016

(54) CONTENT-BASED BILLING

(75) Inventors: Pei-Yuan Zhou, Cupertino, CA (US);
Ivry Semel, San Francisco, CA (US);
Sailendra K. Padala, San Mateo, CA
(US); Philippe Le Rohelec, San
Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2602 days.

(21) Appl. No.: 10/078,051

(22) Filed: Feb. 15, 2002

(65) Prior Publication Data

US 2002/0129088 A1  Sep. 12, 2002

Related U.S. Application Data

(60) Provisional application No. 60/269,699, filed on Feb. 17, 2001.

(51) Int. Cl.
*G06Q 40/00* (2012.01)
*H04L 29/06* (2006.01)
(Continued)

(52) U.S. Cl.
CPC ............ *H04L 63/0281* (2013.01); *G06Q 30/04* (2013.01); *H04L 12/1435* (2013.01); *H04L 12/1485* (2013.01); *H04L 29/06* (2013.01); *H04L 63/029* (2013.01); *H04L 63/083* (2013.01); *H04L 63/0823* (2013.01);
(Continued)

(58) Field of Classification Search
CPC ................ H04M 15/00; H04M 15/68; H04M 2215/0196; G06Q 30/04; G06Q 20/02; G06Q 20/16; H04L 67/2819
USPC ..................................................... 705/40, 35
See application file for complete search history.

(56) References Cited

U.S. PATENT DOCUMENTS 5,339,239 A * 8/1994 Manabe et al. .................... 705/1
5,502,636 A * 3/1996 Clarke ............................ 705/10
(Continued)

FOREIGN PATENT DOCUMENTS

EP   0 511 926 A1   11/1992
WO  WO 97/00471 A2   1/1997
(Continued)

OTHER PUBLICATIONS

16 CFR Ch 1 (Jan. 1, 1998 Edition) Part 308 Trade Regulation Rule pursuant to the Telephone Disclosure and Dispute Resolution Act of 1992 retrieved from http://www.telecompute.com/FTC16CFR_308.pdf.*

(Continued)

*Primary Examiner* — Eric T Wong
*Assistant Examiner* — David Sharvin
(74) *Attorney, Agent, or Firm* — Hickman Palermo Becker Bingham LLP

(57) ABSTRACT

A method and apparatus for content-based billing is provided. Techniques are provided for intercepting, modifying, and retransmitting a request between various entities engaged in content-based billing in the context of the World Wide Web. Various techniques such as HTTP proxy servers, wireless protocol gateways, routers, and level 4 l switches may be used for intercepting the request. The request maybe modified based on numerous factors such as profile information, levels of service, and requested content. The entities that engage in content-based billing include but are not limited to users (including mobile users), content providers, access providers (including HTTP proxy servers).

77 Claims, 2 Drawing Sheets

(51) Int. Cl.
  *G06Q 30/04* (2012.01)
  *H04L 29/08* (2006.01)
  *H04W 4/02* (2009.01)
  *H04W 4/20* (2009.01)
  *H04L 12/14* (2006.01)

(52) U.S. Cl.
  CPC ............ *H04L63/102* (2013.01); *H04L 63/107* (2013.01); *H04L 67/16* (2013.01); *H04L 67/18* (2013.01); *H04L 67/20* (2013.01); *H04L 67/28* (2013.01); *H04L 67/2804* (2013.01); *H04L 67/2814* (2013.01); *H04L 67/2819* (2013.01); *H04L 67/306* (2013.01); *H04L 67/327* (2013.01); *H04L 67/34* (2013.01); *H04L 12/14* (2013.01); *H04L 67/02* (2013.01); *H04L 67/2871* (2013.01); *H04L 69/329* (2013.01); *H04W 4/02* (2013.01); *H04W 4/20* (2013.01)

(56) References Cited

U.S. PATENT DOCUMENTS

| | | | |
|---|---|---|---|
| 5,550,803 A | | 8/1996 | Crayford et al. |
| 5,611,049 A | | 3/1997 | Pitts .................... 395/200.09 |
| 5,960,416 A | * | 9/1999 | Block ............................ 705/34 |
| 5,963,625 A | * | 10/1999 | Kawecki et al. ......... 379/127.01 |
| 6,049,821 A | | 4/2000 | Theriault et al. |
| 6,085,234 A | | 7/2000 | Pitts et al. .................... 709/217 |
| 6,167,385 A | * | 12/2000 | Hartley-Urquhart ........... 705/35 |
| 6,199,054 B1 | * | 3/2001 | Khan et al. .................... 705/400 |
| 6,266,681 B1 | | 7/2001 | Guthrie |
| 6,343,323 B1 | | 1/2002 | Kalpio et al. |
| 6,463,474 B1 | | 10/2002 | Fuh et al. |
| 6,704,612 B1 | * | 3/2004 | Hahn-Carlson ................ 700/213 |
| 6,868,267 B1 | * | 3/2005 | Briggs et al. .................. 455/406 |
| 6,873,691 B1 | * | 3/2005 | Malik ....................... 379/114.28 |
| 7,146,505 B1 | | 12/2006 | Harada et al. |
| 7,203,315 B1 | | 4/2007 | Livesay |
| 2001/0029482 A1 | * | 10/2001 | Tealdi et al. .................... 705/38 |
| 2002/0027901 A1 | * | 3/2002 | Liu et al. ........................ 370/352 |
| 2002/0038363 A1 | | 3/2002 | MacLean |
| 2002/0091757 A1 | | 7/2002 | Cuomo et al. |
| 2002/0124055 A1 | | 9/2002 | Reisman |
| 2002/0131404 A1 | * | 9/2002 | Mehta et al. ................... 370/352 |
| 2002/0133412 A1 | * | 9/2002 | Oliver et al. .................... 705/26 |
| 2002/0138331 A1 | * | 9/2002 | Hosea et al. .................... 705/10 |
| 2004/0005878 A1 | * | 1/2004 | Olin et al. ................... 455/414.1 |

FOREIGN PATENT DOCUMENTS

| | | | |
|---|---|---|---|
| WO | WO 9931610 A1 * | 6/1999 | ............. G06F 17/60 |
| WO | WO 00/46963 A1 | 8/2000 | |
| WO | WO 00/79434 A1 | 12/2000 | |

OTHER PUBLICATIONS

Meyer, Jorg. "How to Manage, Negotiate, and Transfer Personal Information on the Web" Apr. 9, 1999. IBM Corporation Almaden Research Center Publication, pp. 1-126. Retrieved from http://www.almaden.ibm.com/cs/wbi/papers/p3p/.

Barret, R. "Intermediaries: An Approadh to Manipulatiing Information Streams." Nov. 4, 1999. IBM Systems Journals, vol. 38, No. 4 pp. 629-641. Retrieved from http://ww.research.ibm.com/journal/sj/384/barrett.html.

\* cited by examiner

CONTENT-BASED BILLING

PRIORITY CLAIM AND CROSS-REFERENCE TO RELATED APPLICATIONS

This application is related to and claims domestic priority from prior U.S. Provisional Application Ser. No. 60/269,699, filed on Feb. 17, 2001 entitled "Content-Based Billing and Header Based Network API", by Michael M. Tso, Pei-Yuan Zhou, Ivry Semel, Sailendrak Padala, and Philippe Le Rohelec, the entire disclosure of which is hereby incorporated by reference as if fully set forth herein.

FIELD OF THE INVENTION

The present invention relates to applications on the World Wide Web and more specifically to content-based billing on the World Wide Web.

BACKGROUND OF THE INVENTION

Most people that access electronic content do so through an access provider. In the most common scenario, the device used to access electronic content is a desktop computer, the source of the electronic content is a server on the Internet, and the access provider is an Internet Service Provider (ISP). In most cases, an ISP provides one or more devices, referred to herein as access servers, through which users can connect to the Internet. The access servers simply act as pipes through which all messages to and from the user pass.

Typically, the ISP knows little about a user's use of the Internet beyond the times at which the user logs on and logs off, and the number of bytes that pass through the access server in the user's session. Consequently, the ISP has little flexibility with respect to how it will bill for its service. Generally, most ISPs that do not provide wireless connections charge a flat-rate subscription fee, or a time-based usage fee. Access providers that provide access to wireless devices often bill based on "airtime", or the number of bytes retrieved by the user.

For a variety of reasons, it may be desirable for access providers to bill based on other factors. For example, the Internet session of a user of a mobile device, such as an Internet-enabled cell phone or PDA, may include a high percentage of idle time. If the user was charged strictly based on time, the cost of the session may be out of proportion to the service received by the user. As another example, the access provider may want to provide some services, such as advertising, that the user would be able to access without being billed. Conversely, the access provider may want to charge premium rates for the use of other services.

Based on the foregoing, it is clearly desirable to provide systems and techniques that allow access providers to have billing policies that are more flexible than are currently available.

SUMMARY OF THE INVENTION

Techniques are provided for intercepting, modifying, and re-transmitting a request between various entities engaged in content-based billing. Various techniques, involving devices such as HTTP proxy servers, wireless protocol gateways, routers, and level 4 switches, may be used for intercepting a request for content. The request maybe modified based on numerous factors such as profile information, levels of service, and requested content. The entities that engage in content-based billing include but are not limited to users (including mobile users), content providers, and access providers (including HTTP proxy servers). The ability to bill users and/or content providers based on the content that is exchanged between the parties enables the use of billing policies that are much more flexible than those currently in use.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for content-based billing is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
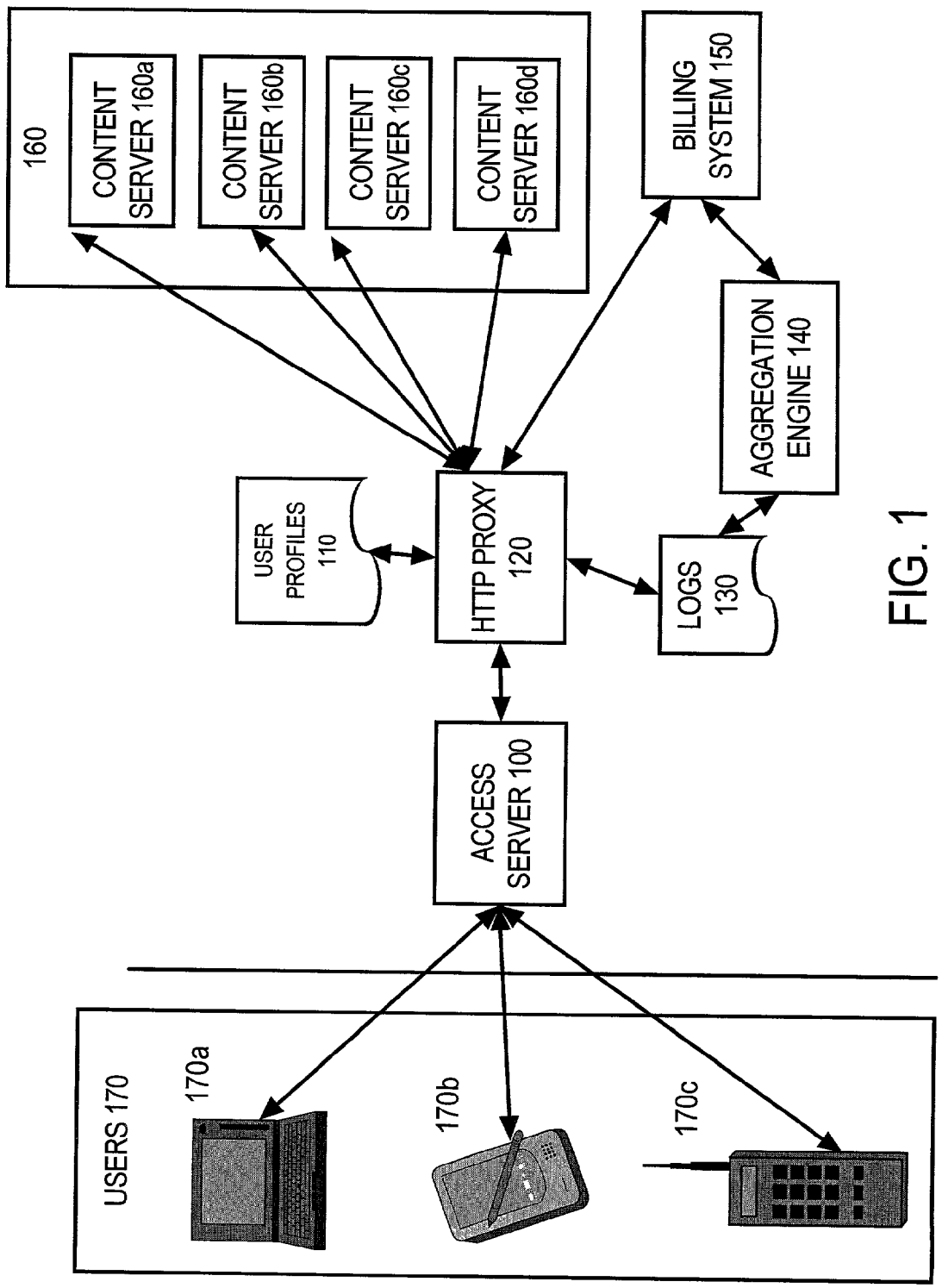
FIG. 1 is a block diagram of a system that allows flexible billing schemes according to an embodiment of the invention.

FIG. 1 is a block diagram of a system that allows flexible billing schemes according to an embodiment of the invention. Referring to FIG. 1, users 170 access services provided by content servers 160 through an access server 100. However, rather than simply act as a pipe for messages, the access server 100 interacts with an HTTP proxy server 120. The HTTP proxy server 120 inspects messages that pass between each user 170 and the content servers 160. The proxy server 120 generates a log 130 to indicate which users (170a, 170b, or 170c) are accessing which services. The access logs 130 are provided to an aggregation engine 140 that places the access information into the format required by the billing system 150. The access information is then fed to the billing system 150, and the users 170 are billed, at least in part, based on the content that they access through the access server 100.

Under certain circumstances, it may be desirable to pre-bill the user 170a prior to providing the user 170a with requested content. Under these circumstances, prior to providing the content to the user 170a, the HTTP proxy 120 may access a source to see if the user 170a has sufficient funds. That source may be, for example, a user profile 110 associated with the user 170a, or the billing system 150 itself. If the user 170a does not have sufficient funds, then the HTTP proxy 120 does not deliver the requested content to the user 170a. If the user 170a does have sufficient funds, then the HTTP proxy 120 causes the funds to be decremented based on the fee associated with the content, and then forwards the content to the user 170a.

Services

An access provider (as represented among other things by access server 100 and HTTP proxy 120) may provide services beyond simply connecting users to a network, such as the Internet. For example, access providers for wireless devices often provide a bundle of services from which their customers may choose. The mobile device displays a menu, where each menu item corresponds to a service. The service may be for (1) content provided by the access provider itself, (2) content provided by third parties (e.g., represented by one or more content servers 160), or (3) some combination of the two.

For the purpose of illustration, it shall be assumed that the content associated with services comes from content servers 160 that are separate from the access server 100. However, the techniques described herein are equally applicable when the access provider is also the provider of the content.

User Identification

Once a user 170a has successfully logged in to the access server 100, the access server 100 typically assigns the user 170a a unique address, and all messages sent by the user 170a during that session include the unique address. For the purpose of explanation, it shall be assumed that the unique address assigned to devices is an IP address, though the actual type of address may vary from implementation to implementation.

The HTTP server 120 sees the IP address in each message that it intercepts, and must be able to determine the user 170a that has been assigned the IP address. According to one embodiment, the user ID-to-IP address mapping for user 170a is communicated from the access server 100 to the HTTP proxy 120 at the time each user (e.g., 170a, 170b, and 170c) initiates a session. Various techniques may be used to communicate this information, including:

the access server 100 sending to the HTTP proxy 120 a packet with the information using a particular protocol supported by the HTTP proxy 120, such as the RADIUS protocol;

the access server 120 sending to a "protocol proxy" a packet with the information using a particular protocol, such as the RADIUS protocol, and then having the protocol proxy send the information from the packet to the HTTP proxy 120 using a different protocol that is supported by the HTTP proxy 120; and the HTTP proxy 120 publishes an API to the access server 100, and the access server 100 makes a call through the API to communicate the information to the HTTP proxy 120.

Preferably, the mechanism employed allows the access provider to use a generic HTTP proxy, thereby avoiding the programming burden that a custom HTTP proxy server would impose.

Message Interception

The HTTP proxy 120 shown in FIG. 1 intercepts messages between user devices such as the devices depicted for users 170 and content servers 160. After intercepting the messages, the HTTP server 120 inspects the messages to see what content the user 170a is requesting/receiving. If the request/receipt of the content has billing implications under the access provider's billing scheme, then the HTTP proxy 120 generates a log 130 to indicate that the user 170a requested/received the content. In addition to generating a log 130 to indicate which services/content the user 170a requested/received, the HTTP server 120 may handle the message in a different manner than simply forwarding the message. Various examples of how the HTTP proxy server 120 may handle messages in particular situations shall be described hereafter.

The illustrated embodiment uses an HTTP proxy 120 to perform the message interception. However, using HTTP proxy 120 is only one of many techniques for performing the message interception. Other known techniques for intercepting messages involve the use of wireless protocol gateways, routers, and level 4 switches. The present invention is not limited to any particular technique or mechanisms for intercepting messages. Preferably, the mechanism used to intercept messages is capable of both intercepting messages that are in transit, and of reinserting messages (often after some modification) back into transit. It is also preferable that the mechanism be capable of intercepting both messages in both directions: from users 170 to servers 160, and from servers 160 to users 170.

User Profiles

Different users may register for different services, or different classes of the same service. According to one embodiment, the access server 100 maintains user profiles (of which user profile 110 is an example) that indicate, among other things, the services for which each user (e.g., any one of the users 170) has registered.

Using the techniques described herein, the access provider is able to establish flexible and sophisticated billing schemes. Part of that flexibility results from the ability to store user-specific billing data in the user profiles 110. For example, if a given service supports different classes of service, then the user profile 110 of a user 170a will also indicate the class of the service for which the user 170a is registered. The class of service reflected in the profile 110 may be used to determine how much the user 170a is to be billed when the user 170a accesses the service.

The access providers may also have a classification system for users 170, where certain "gold" members are charged certain rates for services, while "silver" members are charged different rates. Rate plans (described in more detail hereinafter) are one way of providing these different rates. The user's profile 110 may indicate the user class to which the user 170a belongs.

Redirecting Requests

According to one aspect of the invention, the HTTP proxy 120 may redirect an intercepted request based on the profile of the user that sent the request. For example, a user 170a may send a message requesting a stock quote from a stock quote service. If the user 170a belongs to the "gold" class for the service, then user 170a is allowed to access a real-time stock quote. If the user 170a belongs to the "silver" class for the service, then the user 170a is allowed to access a quote that is 10 minutes old. In response to determining that the request is for a stock quote, the HTTP proxy 120 reads the profile 110 of the user 170a to determine the class of service for which the user 170a is subscribed, and redirects the request to the appropriate source. For example, the HTTP proxy 120 may direct the request to one URL if the user 170a belongs to the gold class, and to a different URL if the user 170a belongs to the silver class.

By putting the intelligence to redirect messages to appropriate destinations on the server side, greater flexibility can be achieved without adding complexity to the user devices. For example, the fact that a user 170a belongs to particular classes for particular services is completely transparent to the user's device. This is particularly important when the user devices are relatively small and unsophisticated mobile devices.

Redirecting a request is just one example of how the HTTP proxy 120 may alter and/or transform a request based on information in the user's profile 110, and the identity of the content that is being requested and/or received. As another example, the HTTP proxy 120 may determine that the user 170*c* is requesting a service that requires certain information about the user 170*c*, such as the current location of the mobile user 170*c*. The HTTP proxy 120 may, transparent to the user 170*c*, insert into the request the additional content required by the service prior to forwarding the request to the content server 160*a* for that service.

The general steps are:
intercepting the request
identifying the user 170*c* that submitted the request
identifying the profile 110 that corresponds to the user 170*c*
modifying the request based on the user's profile 110
retransmitting the modified request Updating User Profiles According to one aspect of the invention, the profile 110 of a user 170*a* may be updated based on the content requested/received by the user 170*a*. For example, the user profile 110 may indicate that the user 170*a* is allowed to access a particular service three times a month for free, and then is charged for any additional accesses. Under these circumstances, the user's profile 110 may include a number that indicates how many times the user 170*a* has accessed the service during the current month. Every time the user 170*a* accesses the service, the number is incremented until it reaches three. Once it has reached three, then rather than increment the number in response to the user 170*a* requesting the service, the HTTP proxy 120 generates a log 130 that, when supplied to the billing system 150, will cause the user 170*a* to be billed. The number would then be reset at the beginning of each month.

The above example is simply one of many situations in which it is desirable to modify the profile 110 of a user 170*a* in response to the content that is being requested/received by the user 170*a*. Other examples include decrementing an account balance stored in the profile 110 when the user 170*a* accesses services that have fees, marking a user 170*a* for participation in a prize drawing in response to reward the user 170*a* for looking at advertisements, etc.

Authorization

Most access providers have a mechanism for determining that users are allowed to access their services. For example, when a user 170*a* attempts to establish a connection to the Internet through an ISP, the ISP typically requests the user ID and password of the user 170*a*. If the user ID/password combination matches that of an authorized user 170*a*, then the requested connection is established. Otherwise, the user 170*a* is denied the connection.

According to one aspect of the invention, the access provider's ability to authorize user action is extended beyond the mere ability to grant or deny a connection. Rather, since the HTTP proxy 120 is monitoring the content that is requested/received by a user 170*a*, the access provider is able to grant or deny access to specific content. For example, the user 170*a* may have subscribed to a certain class of a particular service. If the user 170*a* requests content that is not available to that certain class, then the HTTP proxy 120 can send the user 170*a* an appropriate message, and prevent the user's request from being forwarded to the content server 160*a*.

Content Provider Profiles

According to one aspect of the invention, the techniques described above for handling users 170 may be applied in a similar manner to content providers (as represented by one or more content servers such as 160*a*, 160*b*, 160*c*, and 160*d*). For example, the HTTP proxy 120 may store content provider profiles, and examine the profiles to determine how to process content received from the content providers. For example, just as the users 170 are charged for accessing certain content, content providers may be charged for providing certain content.

For example, the access provider may provide a service that allows users 170 to make purchases from a particular content provider. The access provider may enter an agreement with the content provider that give the access provider a commission on purchases made by its users 170. Under these circumstances, the HTTP proxy 120 may be configured to generate a log 130 when it detects that the content provided by the content provider indicates a purchase by a user 170*a*. This log information 130 can be fed to the billing system 150 by the aggregation engine 140 to bill the content provider for the commission.

Thus, during any transaction conducted through messages that are intercepted by the HTTP proxy 120, the HTTP proxy 120 may inspect the profiles for any of the participants (such as 170*a*, 170*b*, 170*c*, 160*a*, 160*b*, 160*c*, 160*d*) in the transaction, modify the profiles for any of the participants in the transaction, and bill any of the participants in the transaction.

Processing Logs

In the embodiment shown in FIG. 1, an aggregation engine 140 processes the logs 130 generated by the HTTP proxy 120 and feeds the data into the billing system 150. In one embodiment, a single aggregation engine 140 may be used to process the logs of many HTTP proxies 120. For example, one access provider may have multiple access servers 100 and multiple HTTP proxies 120, but a single billing system 150. The logs 130 from all HTTP proxies 120 may be processed by a single aggregation engine 140, which sends the results to the billing system 150.

Component Communication

In the techniques described above, communication occurs between various distinct components. For example, the access server 120 communicates the user ID-to-IP address mapping information to the HTTP proxy 120 when a user 170*a* starts a session, the aggregate engine 140 communicates with the billing system 150, etc. Preferably, these communications take place using a standardized protocol established for these communications.

Sample Scenarios
Scenario 1:
A user 170*a* requests a service.
The HTTP proxy server 120 intercepts the request.
The HTTP proxy server 120 determines the user ID (for user 170*a*) based on the IP address.
The HTTP proxy server 120 determines, from the user's profile 110, the service class of that service for that user 170*a*.
The HTTP proxy server 120 modifies the request based on the service class and transmits the modified request.
The HTTP proxy server 120 intercepts the response back from the content server 160*a*.

The HTTP proxy server 120 determines the content provider ID based on the URL associated with the content.

The HTTP proxy server 120 determines, from the user's profile 110 and/or the content provider's profile, that the user 170a is to pre-pay fifty cents to receive the content.

The HTTP proxy server 120 sends a message to the user 170a asking the user 170a if the user 170a authorizes payment.

In response to receiving authorization, the HTTP proxy server 120 does the following:

forwards the content to the user 170a;

obtains the price of the service that the user 170a requested from the billing system 150; and modifies the user's profile 110 to deduct fifty cents from an account balance indicated in the user's profile 110.

Scenario 2:

A user 170a requests a service.

The HTTP proxy server 120 intercepts the request.

The HTTP proxy server 120 determines the user ID based on the IP address.

The HTTP proxy server 120 obtains the price of the service that the user 170a requested from the billing system 150.

The HTTP proxy server 120 sends a message to the user 170a authorizing the payment of the fee;

The HTTP proxy server 120 receives a message from the user 170a indicating that the payment is not authorized.

The HTTP proxy server 120 does not forward the request to the content server 160a.

Scenario 3:

A user 170a requests a service.

The HTTP proxy server 120 intercepts the request.

The HTTP proxy server 120 determines the user ID based on the IP address.

The HTTP proxy server 120 obtains the price of the service that the user 170a requested from the billing system 150.

The HTTP proxy server 120 forwards the request to the content server 160a.

The HTTP proxy server 120 intercepts the content from the content server 160a.

The HTTP proxy server 120 inspects the profile of the content provider to determine that the content provider is to be billed for providing that content.

The HTTP proxy server 120 provides the content to the user 170a.

The HTTP proxy server 120 generates a log 130 indicating that the user 170a requested the service, and the amount the user 170a is to be billed;

The HTTP proxy server 120 generates a log 130 indicating that the content provider is to be billed.

The aggregate engine 140 sends the logs 130 to the billing system 150.

Bills are sent to the user 170a and the content provider

An Operational Example

A user 170a subscribes to a service, such as ATT wireless for voice capabilities, and in so doing the access provider (e.g., ATT) creates an account for the user 170a. Then sometime later, the user 170a decides to add content billing capability for accessing data services via URLs in which case the user 170a buys a deal. In response to the deal purchase, the access provider creates a user profile 110 that identifies the deals purchased by the user 170a. Each deal maps to a set of URLs. The URLs correspond to products. Thus, the deals purchased by a user 170a determine the set of URLs the user 170a may access, and consequently the products that are available to the user 170a.

When a user 170a requests a product by accessing a particular URL, the user profile 110 is inspected to determine whether the user 170a is authorized to access that URL. Once the product has been sent to the user 170a, the access provider sends to the billing system 150 a record that contains the details of the transaction. Within the billing system 150, the record is compared with one or more rate plans to determine a per-use charge for that transaction. The per-use charge thus determined may be in addition to a flat rate charged for the deals purchased by the user 170a.

The rate plans are price lists that may take into account a variety of factors beyond the identity of the product purchased, such as the time of day, the volume of data transferred, the time consumed in the transaction, etc. The rate plans that apply to a particular user may vary based on the deals purchased by the user 170a.

Hardware Overview

Figure 2:
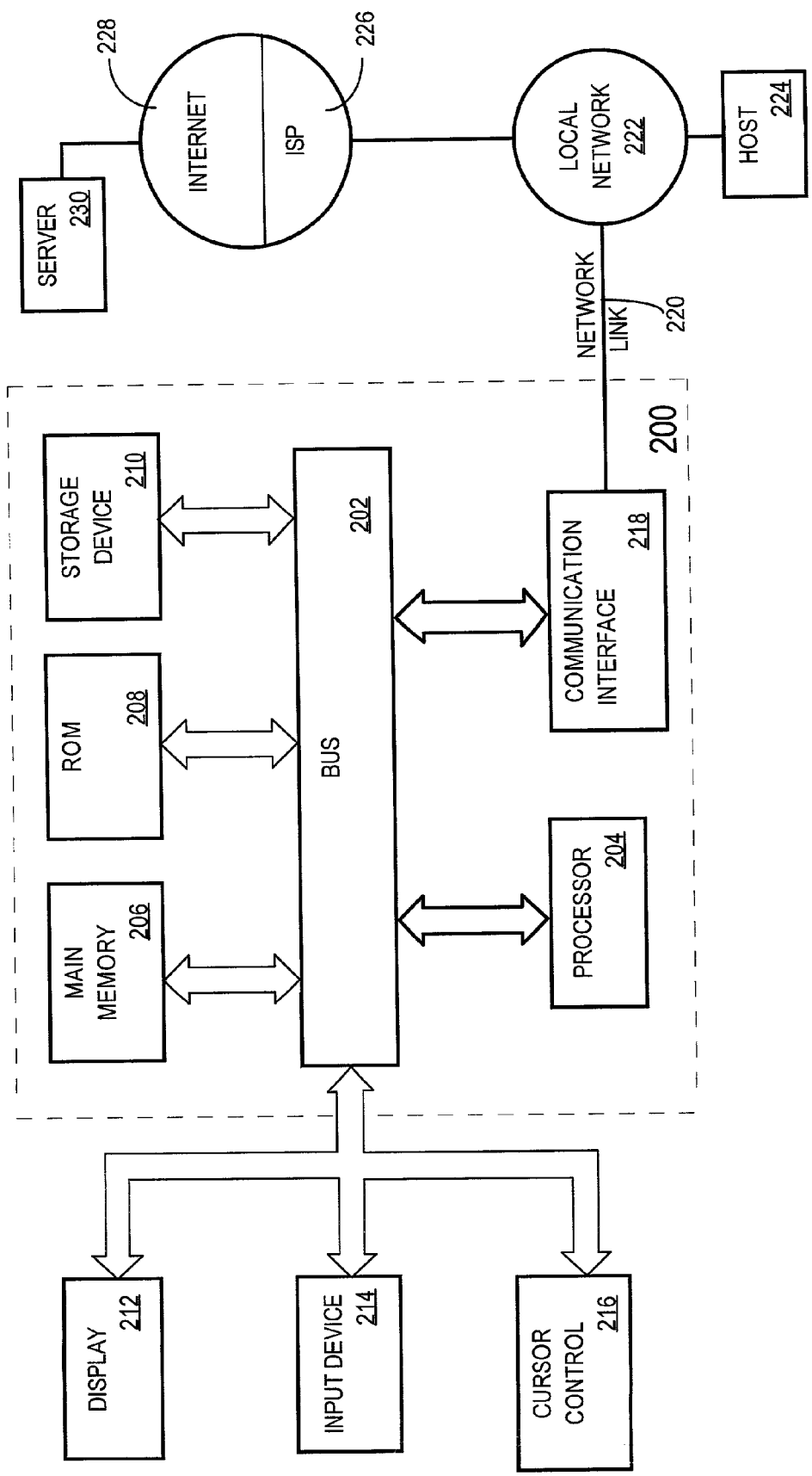
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

HEADER-BASED NETWORK API

The Internet is a network composed of many smaller private networks. Most network communications are accomplished using messages that have headers. Typically, a message header has information necessary to make sure the message is delivered to the correct destination. It may also include additional information, such as data that identifies the source of the message.

According to one aspect of the invention, information from a private network is conveyed to authorized parties outside the network by inserting the information into the header of messages that are directed to those parties.

Specifically, HTTP is the protocol used for most Internet traffic. The HTTP protocol specifies the transmission of information in packets that have headers. According to one embodiment, when a user sends a message to a content server, the message is intercepted at the access server and, depending on the destination of the message, information that is otherwise only available within the private network of the access provider is inserted into the HTTP header of the message. The content server reads the information from the header when the content server receives the message.

Message headers may be used by third parties to provide information to a private network. For example, assume that a content provider charges different fees for accessing different content on its service. If the fee schedule for the content provider is maintained in the content provider profile, then the content provider profile for the client maintained by every access server has to be updated every time the fees change. On the other hand, the content provider may simply dynamically insert the current fee for accessing particular content into the message header of a message that delivers that particular content.

For example, assume that a content provider charges five cents for each stock quote, and the charge is to be billed by the access provider. Rather than maintain data indicating the five cent fee in the content provider profile, the content server may insert the fee amount in the header of each message that delivers a stock quote. Consequently, if the content provider decides to increase the fee to seven cents, the content provider merely changes the data that determines the value inserted into the header. The access provider need not make any change to the content provider profile.

A typical scenario could proceed as follows:

The proxy server intercepts a request for a service provided by a content provider.

The request is forwarded to the content provider.

The content provider replies with a message that, within its header, indicates a particular fee for the service.

The proxy server verifies that the content provider is an approved partner.

The proxy server checks the user profile to determine whether the user has sufficient funds, and whether the user is authorized to make such purchases.

The proxy server sends a message to the user requesting authorization of payment.

The proxy server receives authorization of payment from user.

The proxy server deducts the fee from the user's balance and forwards the content to the user.

Under various circumstances, such as when a user is charged a fee from a third party, it is critical to authenticate the identity of the parties involved. The user is typically authenticated at the time the user starts a session by requiring the user to login with a valid user ID/password combination.

The third-party content provider may be authenticated, in turn, prior to completion of the transaction. For example, when the proxy server intercepts a request for a service, the proxy server may inspect the content provider profile to determine whether the service involves a fee. If it does, the proxy server may establish a secure connection with the content provider, and authenticate the content provider through any number of authentication mechanisms, such as through the use of digital certificates.

In an embodiment, via a proxy server or similar device (like a GGSN), additional fields are inserted and removed to the HTTP headers between the client and the content server. The fields' format and values can be agreed to between the network operator and its partners, and could be standardized as an industry standard. This can be implemented as plug-ins to TS.

An HTTP header format may be standardized so that third party content providers can invoke the billing services of an operator. For example, a user may visit a content site that wants to charge fifty cents to access that content. The reply header includes this information, and the platform will create a confirmation page to ask the user if that is okay with them, and then add the charge to their billing record (by interfacing directly with the operator's billing server). The confirmation page can be bypassed if user sets a preference to do so.

In an embodiment, no partner code is required in the operator's network, and vice versa. HTTP header parsing is supported by most webservers, and it will not break any existing network equipment like switches and routers, and will simply be ignored by any webserver that does not support these extensions.

This idea can be extended to include all kinds of transactions of all sizes. Also content providers could just as well be car washes, soda machines, etc (imagine the soda machine is just represented as a URL to which one sends an HTTP request, and that responds with a billing record).

In the description given above, the conversation between the proxy server and the third party is piggybacked on the conversation between the user and the third party using the headers of the user's messages and the response to those messages. However, in alternative embodiments, the conversation is piggybacked by inserting information into portions of the messages other than the header.

What is claimed is:

1. A method comprising the computer-implemented steps of:
   at an intercepting device, intercepting a Hyper-Text Transport Protocol ("HTTP") response message that has been sent over a computer network from a provider server device to a requestor client device, prior to said HTTP response message arriving at said requestor client device;
   wherein the intercepting device is deployed on the computer network between the provider server device and the requestor client device, wherein the HTTP response message provides content and is addressed to said requestor client device and not to the intercepting device;
   based at least on the intercepted HTTP response message, the intercepting device determining what content is being provided by the provider server device in the HTTP response message;
   before the content is delivered to the requestor client device, the intercepting device determining whether the requestor client device is associated with any user of a first set of users or any user of a second set of users, wherein each user in the first set of users is required to authorize payment for the content, wherein each user in the second set of users is not required to authorize payment for the content;
   responsive to the determining that the requestor client device is associated with a user in the first set of users, the intercepting device sending the requestor client device a payment authorization request message;
   responsive to detecting that the requestor client device has authorized payment for the content, the intercepting device transmitting the HTTP response message from the intercepting device to allow the requestor client device to obtain the content;
   wherein the method is performed by one or more computer devices.

2. The method of claim 1 further comprising the steps of:
   determining that said content is being or has been provided to said requestor client device by said provider server device through, at least in part, the intercepted HTTP response message;
   sending data about the payment to a billing service in response to said determining that said content is being or has been provided to said requestor client device by said provider server device through, at least in part, the intercepted HTTP response message.

3. The method of claim 1 wherein:
   the intercepting device performs the step of requesting payment authorization on behalf of the provider server device.

4. The method of claim 1, further comprising:
   at the intercepting device, generating a log of said HTTP response message;
   sending billing data to a billing service based on the log.

5. The method of claim 4, further comprising, at an aggregation engine external to the intercepting device, reading the log, wherein the aggregation engine is configured to send the billing data to the billing service based on the log.

6. The method of claim 4 wherein the log includes information to indicate how much an entity associated with the requestor client device or the provider server device is to pay for delivery of the content to the requestor client device.

7. The method of claim 4 further comprising the computer-implemented step of:
   reading a plurality of logs, including said log, at an aggregation engine that places access information contained in said plurality of logs into a format required by a billing system.

8. The method of claim 1, further comprising:
   determining that a particular entity associated with the requestor client device or the provider server device must pre-pay for delivery of the content;
   determining whether the particular entity has sufficient funds to pay for the content; and determining how to handle said HTTP response message based on whether said particular entity has sufficient funds to pay for the content.

9. The method of claim 1 further comprising the computer-implemented steps of:
inspecting one of a provider profile associated with the provider server device or a requestor profile associated with the requestor client device; and
based on the provider profile or the requestor profile, determining that an entity associated with the requestor client device must pre-pay for the content.

10. The method of claim 1 wherein the HTTP response message includes a price at which the provider server device is providing the content.

11. The method of claim 1 further comprising the step of decrementing an account balance associated with the requestor client device or the provider server device when the requestor client device accesses the content.

12. The method of claim 1 further comprising updating a requestor profile to award the requestor client device a prize for having requested said content.

13. The method of claim 1 further comprising inspecting a profile associated with the requestor client device to determine whether the requestor client device is in the first set of users or is in the second set of users.

14. The method of claim 1 further comprising the computer-implemented steps of:
determining whether an entity associated with the requestor client device has funds to pay for the content based on an authorization source.

15. The method of claim 14 wherein the authorization source is one of a profile, a billing system, or a billing scheme of an access provider.

16. The method of claim 1 further comprising the computer-implemented steps of:
determining whether the provider server device is associated with an authorized partner; and
if the provider server device is associated with an authorized partner, then retransmitting the HTTP response message to the requestor client device.

17. The method of claim 16 wherein the step of determining whether the provider server device is associated with an authorized partner further comprises the computer-implemented steps of:
determining whether the content involves a fee by inspecting a provider profile;
if the content does involve a fee, then
establishing a secure connection with the provider server device; and
authenticating the provider server device by using an authentication mechanism.

18. The method of claim 1, further comprising billing an account associated with the provider server device for providing the content.

19. The method of claim 1, further comprising determining the type of the content based upon a URL path associated with the content.

20. The method of claim 1, further comprising:
determining whether said content has billing implications;
if said content has billing implications, sending billing data to a billing service, the billing data being based at least in part on the determined content.

21. A non-transitory computer-readable medium storing one or more sequences of instructions which, when executed by one or more processors, causes the one or more processors to perform the steps of:
at an intercepting device, intercepting a Hyper-Text Transport Protocol ("HTTP") response message that has been sent over a computer network from a provider server device to a requestor client device, prior to said HTTP response message arriving at said requestor client device;
wherein the intercepting device is deployed on the computer network between the provider server device and the requestor client device, wherein the HTTP response message provides content and is addressed to said requestor client device and not to the intercepting device;
based at least on the intercepted HTTP response message, the intercepting device determining what content is being provided by the provider server device in the HTTP response message;
before the content is delivered to the requestor client device, the intercepting device determining whether the requestor client device is associated with any user of a first set of users or any user of a second set of users, wherein each user in the first set of users is required to authorize payment for the content, wherein each user in the second set of users is not required to authorize payment for the content;
responsive to the determining that the requestor client device is associated with a user in the first set of users, the intercepting device sending the requestor client device a payment authorization request message;
responsive to detecting that the requestor client device has authorized payment for the content, the intercepting device transmitting the HTTP response message from the intercepting device to allow the requestor client device to obtain the content.

22. The non-transitory computer-readable medium of claim 21, further storing one or more sequences of instructions which, when executed by one or more processors, causes the one or more processors to perform:
at the intercepting device, generating a log of said HTTP response message;
sending data to a billing service based on the log.

23. The non-transitory computer-readable medium of claim 22, further storing one or more sequences of instructions which, when executed by one or more processors, causes the one or more processors to perform:
at an aggregation engine external to the intercepting device, reading the log, wherein the aggregation engine is configured to send the billing data to the billing service based on the log.

24. The non-transitory computer-readable medium of claim 22 wherein the log includes information to indicate how much an entity associated with the requestor client device or the provider server device is to pay for delivery of the content to the requestor client device.

25. The non-transitory computer-readable medium of claim 22 further storing one or more sequences of instructions which, when executed by one or more processors, causes the one or more processors to perform the step of reading a plurality of logs, including said log, at an aggregation engine that places access information contained in said plurality of logs into a format required by a billing system.

26. The non-transitory computer-readable medium of claim 21 further storing one or more sequences of instructions which, when executed by one or more processors, causes the one or more processors to perform the step of:
determining that a particular entity associated with the requestor client device or the provider server device must pre-pay for delivery of the content;

determining whether the particular entity has sufficient funds to pay for the content; and
determining how to handle said HTTP response message based on whether said particular entity has sufficient funds to pay for the content.

27. The non-transitory computer-readable medium of claim 21 further storing one or more sequences of instructions which, when executed by one or more processors, causes the one or more processors to perform the step of:
    inspecting one of a provider profile associated with the provider server device or a requestor profile associated with the requestor client device; and
    based on the provider profile or the requestor profile, determining that an entity associated with the requestor client device must pre-pay for the content.

28. The non-transitory computer-readable medium of claim 21 wherein the HTTP response message includes a price at which the provider server device is providing the content.

29. The non-transitory computer-readable medium of claim 21 further storing one or more sequences of instructions which, when executed by one or more processors, causes the one or more processors to perform the step of decrementing an account balance associated with the requestor client device or the provider server device when the requestor client device accesses the content.

30. The non-transitory computer-readable medium of claim 21 further storing one or more sequences of instructions which, when executed by one or more processors, causes the one or more processors to perform the step of updating a requestor profile to award the requestor client device a prize for having requested said content.

31. The non-transitory computer-readable medium of claim 21 further storing one or more sequences of instructions which, when executed by one or more processors, causes the one or more processors to perform the step of inspecting a profile associated with the requestor client device to determine whether the requestor client device is in the first set of users or is in the second set of users.

32. The non-transitory computer-readable medium of claim 21 further storing one or more sequences of instructions which, when executed by one or more processors, causes the one or more processors to perform the step of:
    determining whether an entity associated with the requestor client device has funds to pay for the content based on an authorization source.

33. The non-transitory computer-readable medium of claim 32 wherein the authorization source is one of a profile, a billing system, or a billing scheme of an access provider.

34. The non-transitory computer-readable medium of claim 21 further storing one or more sequences of instructions which, when executed by one or more processors, causes the one or more processors to perform the step of:
    determining whether the provider server device is associated with an authorized partner; and
    if the provider server device is associated with an authorized partner, then retransmitting the HTTP response message to the requestor client device.

35. The non-transitory computer-readable medium of claim 34 wherein instructions for determining whether the provider server device is associated with an authorized partner further comprise one or more sequences of instructions which, when executed by one or more processors, causes the one or more processors to perform the step of:
    determining whether the content involves a fee by inspecting a provider profile;
    if the content does involve a fee, then
        establishing a secure connection with the provider server device; and
        authenticating the provider server device by using an authentication mechanism.

36. The non-transitory computer-readable medium of claim 21, further storing one or more sequences of instructions which, when executed by one or more processors, causes the one or more processors to perform:
    determining that said content is being or has been provided to said requestor client device by said provider server device through, at least in part, the intercepted HTTP response message;
    sending data about the payment to a billing service in response to said determining that said content is being or has been provided to said requestor client device by said provider server device through, at least in part, the intercepted HTTP response message.

37. The non-transitory computer-readable medium of claim 21, further storing one or more sequences of instructions which, when executed by one or more processors, causes the one or more processors to perform:
    billing an account associated with the provider server device for providing the content.

38. The non-transitory computer-readable medium of claim 21, further storing one or more sequences of instructions which, when executed by one or more processors, causes the one or more processors to perform:
    determining whether said content has billing implications;
    if said content has billing implications, sending billing data to a billing service, the billing data being based at least in part on the determined content.

39. The non-transitory computer-readable medium of claim 21, further comprising determining the type of the content based upon a URL path associated with the content.

40. A method comprising:
    at an intercepting device, intercepting an HTTP response message that has been sent over a computer network from a provider server device to a requestor client device, prior to said HTTP response message being received by the requestor client device;
        wherein the HTTP response message comprises a body and a header;
        wherein the intercepting device is deployed on the computer network between the provider server device and the requestor client device, wherein the HTTP response message is addressed to the requestor client device and not the intercepting device;
        wherein the HTTP response message includes a price at which the provider is willing to provide to the requestor content, the body of the HTTP response message comprising the content;
    reading the price from the HTTP response message;
    the intercepting device forwarding the HTTP response message to the requestor client device;
    sending billing data to a billing service, the billing data being based on the price that was read from the HTTP response message;
    wherein the method is performed by one or more computer devices.

41. The method of claim 40 further comprising the steps of:
    determining that said content is being or has been provided to said requestor client device by said provider server device through, at least in part, the intercepted HTTP response message;
    wherein sending data to said billing service occurs in response to said determining that said content is being or has been provided to said requestor client device by said provider server device through, at least in part, the intercepted HTTP response message.

42. The method of claim 40, further comprising billing an account associated with the provider server device for providing the content.

43. The method of claim 40, wherein the intercepting device performs the step of reading the price from the HTTP response message.

44. The method of claim 40, further comprising:
at the intercepting device, generating a log of said HTTP response message;
wherein the billing data sent to the billing service is based on the log.

45. The method of claim 44, further comprising, at an aggregation engine external to the intercepting device, reading the log, generating the billing data based on the log, and sending the billing data.

46. The method of claim 44, wherein the log includes information to indicate how much the requestor client device or the provider server device is to pay for the content.

47. The method of claim 44, further comprising the computer-implemented step of:
reading a plurality of logs, including said log, at an aggregation engine that places access information contained in said plurality of logs into the format required by the billing service.

48. The method of claim 40, further comprising:
prior to the intercepting device forwarding the HTTP response message, the intercepting device sending a confirmation page requesting payment authorization for the price from the requestor client device on behalf of the provider server device.

49. The method of claim 40, further comprising:
determining that the requestor client device must pre-pay for the content;
determining whether the requestor client device has sufficient funds to pay for the content; and
determining how to handle said HTTP response message based on whether said requestor client device has sufficient funds to pay for the content.

50. The method of claim 40, further comprising the computer-implemented steps of:
inspecting one of a provider profile associated with the provider server device or a requestor profile associated with the requestor client device; and
based on the provider profile or the requestor profile, determining that the requestor client device must pre-pay for the content.

51. The method of claim 40, further comprising the step of decrementing an account balance of the requestor client device based on the price.

52. The method of claim 40, further comprising updating a requestor profile to award the requestor client device a prize for having requested said content.

53. The method of claim 40, further comprising inspecting a profile to determine whether the requestor client device requires pre-authorization for the content.

54. The method of claim 40, further comprising the computer-implemented steps of:
determining whether the requestor client device has funds to pay for the content based on an authorization source.

55. The method of claim 54, wherein the authorization source is one of a profile, a billing system, and a billing scheme of an access provider.

56. The method of claim 40, further comprising the computer-implemented steps of:
determining whether the provider server device is associated with an authorized partner; and
if the provider server device is associated with an authorized partner, then retransmitting the HTTP response message to the requestor client device.

57. The method of claim 40, further comprising reading the price from the header of the HTTP response message.

58. The method of claim 40, further comprising:
locating requestor preference data associated with the requestor client device;
prior to forwarding the HTTP request message to the requestor client device, determining whether to send, to the requestor client device, a confirmation page indicating the price that was read from the HTTP response message;
responsive to determining to send the confirmation page, sending the confirmation page to the requestor client device and waiting for a requestor authorization message before forwarding the HTTP request message;
responsive to determining not to send the confirmation page, forwarding the HTTP request message without waiting for a requestor authorization message.

59. A non-transitory computer-readable medium storing one or more sequences of instructions which, when executed by one or more processors, causes the one or more processors to perform the steps of:
at an intercepting device, intercepting an HTTP response message that has been sent over a computer network from a provider server device to a requestor client device, prior to said HTTP response message being received by the requestor client device;
wherein the HTTP response message comprises a body and a header;
wherein the intercepting device is deployed on the computer network between the provider server device and the requestor client device, wherein the HTTP response message is addressed to the requestor client device and not the intercepting device;
wherein the HTTP response message includes a price at which the provider is willing to provide to the requestor content, the body of the HTTP response message comprising the content;
reading the price from the HTTP response message;
the intercepting device forwarding the HTTP response message to the requestor client device;
sending billing data to a billing service, the billing data being based on the price that was read from the HTTP response message.

60. The non-transitory computer-readable medium of claim 59, further storing one or more sequences of instructions which, when executed by one or more processors, causes the one or more processors to perform the step of:
determining that said content is being or has been provided to said requestor client device by said provider server device through, at least in part, the intercepted HTTP response message;
wherein sending data to said billing service occurs in response to said determining that said content is being or has been provided to said requestor client device by said provider server device through, at least in part, the intercepted HTTP response message.

61. The non-transitory computer-readable medium of claim 59, further storing one or more sequences of instructions which, when executed by one or more processors, causes the one or more processors to perform the step of billing an account associated with the provider server device for providing the content.

62. The non-transitory computer-readable medium of claim 59, wherein the intercepting device performs the step of reading the price from the HTTP response message.

63. The non-transitory computer-readable medium of claim 59, further storing one or more sequences of instructions which, when executed by one or more processors, causes the one or more processors to perform the step of:
at the intercepting device, generating a log of said HTTP response message;
wherein the billing data sent to the billing service is based on the log.

64. The non-transitory computer-readable medium of claim 63, further storing one or more sequences of instructions which, when executed by one or more processors, causes the one or more processors to perform the step of, at an aggregation engine external to the intercepting device, reading the log, generating the billing data based on the log, and sending the billing data.

65. The non-transitory computer-readable medium of claim 63, wherein the log includes information to indicate how much the requestor client device or the provider server device is to pay for the content.

66. The non-transitory computer-readable medium of claim 63, further storing one or more sequences of instructions which, when executed by one or more processors, causes the one or more processors to perform the step of:
reading a plurality of logs, including said log, at an aggregation engine that places access information contained in said plurality of logs into the format required by the billing service.

67. The non-transitory computer-readable medium of claim 59, further storing one or more sequences of instructions which, when executed by one or more processors, causes the one or more processors to perform:
prior to the intercepting device forwarding the HTTP response message, the intercepting device sending a confirmation page requesting payment authorization for the price from the requestor client device on behalf of the provider server device.

68. The non-transitory computer-readable medium of claim 59, further storing one or more sequences of instructions which, when executed by one or more processors, causes the one or more processors to perform:
determining that the requestor client device must pre-pay for the content;
determining whether the requestor client device has sufficient funds to pay for the content; and
determining how to handle said HTTP response message based on whether said requestor client device has sufficient funds to pay for the content.

69. The non-transitory computer-readable medium of claim 59, further storing one or more sequences of instructions which, when executed by one or more processors, causes the one or more processors to perform:
inspecting one of a provider profile associated with the provider server device or a requestor profile associated with the requestor client device; and
based on the provider profile or the requestor profile, determining that the requestor client device must pre-pay for the content.

70. The non-transitory computer-readable medium of claim 59, further storing one or more sequences of instructions which, when executed by one or more processors, causes the one or more processors to perform: decrementing an account balance of the requestor client device based on the price.

71. The non-transitory computer-readable medium of claim 59, further storing one or more sequences of instructions which, when executed by one or more processors, causes the one or more processors to perform: updating a requestor profile to award the requestor client device a prize for having requested said content.

72. The non-transitory computer-readable medium of claim 59, further storing one or more sequences of instructions which, when executed by one or more processors, causes the one or more processors to perform: inspecting a profile to determine whether the requestor client device requires pre-authorization for the content.

73. The non-transitory computer-readable medium of claim 59, further storing one or more sequences of instructions which, when executed by one or more processors, causes the one or more processors to perform:
determining whether the requestor client device has funds to pay for the content based on an authorization source.

74. The non-transitory computer-readable medium of claim 73, wherein the authorization source is one of a profile, a billing system, and a billing scheme of an access provider.

75. The non-transitory computer-readable medium of claim 59, further storing one or more sequences of instructions which, when executed by one or more processors, causes the one or more processors to perform:
determining whether the provider server device is associated with an authorized partner; and
if the provider server device is associated with an authorized partner, then retransmitting the HTTP response message to the requestor client device.

76. The non-transitory computer-readable medium of claim 59, further storing one or more sequences of instructions which, when executed by one or more processors, causes the one or more processors to perform reading the price from the header of the HTTP response message.

77. The non-transitory computer-readable medium of claim 59, further storing one or more sequences of instructions which, when executed by one or more processors, causes the one or more processors to perform:
locating requestor preference data associated with the requestor client device;
prior to forwarding the HTTP request message to the requestor client device, determining whether to send, to the requestor client device, a confirmation page indicating the price that was read from the HTTP response message;
responsive to determining to send the confirmation page, sending the conformation page to the requestor client device and waiting for a requestor authorization message before forwarding the HTTP request message;
responsive to determining not to send the confirmation page, forwarding the HTTP request message without waiting for a requestor authorization message.

* * * * *